(12) United States Patent
Wilson

(10) Patent No.: US 8,151,620 B2
(45) Date of Patent: Apr. 10, 2012

(54) METHOD FOR CONTROLLING SOLENOID PRESSURE

(75) Inventor: Thomas H. Wilson, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 12/413,245

(22) Filed: Mar. 27, 2009

(65) Prior Publication Data

US 2009/0281698 A1 Nov. 12, 2009

Related U.S. Application Data

(60) Provisional application No. 61/051,780, filed on May 9, 2008.

(51) Int. Cl.
*G01L 27/00* (2006.01)

(52) U.S. Cl. .......................................... 73/1.63; 477/34

(58) Field of Classification Search ........................ None
See application file for complete search history.

(56) References Cited

U.S. PATENT DOCUMENTS

| 5,759,134 | A | * | 6/1998 | Kuriyama | 477/158 |
| 5,816,978 | A | * | 10/1998 | Tabata et al. | 477/156 |
| 6,382,248 | B1 | | 5/2002 | Long et al. | |
| 7,069,767 | B2 | | 7/2006 | Runde et al. | |
| 2009/0118082 | A1 | * | 5/2009 | Heap et al. | 477/5 |

* cited by examiner

*Primary Examiner* — Paul N Dickson
*Assistant Examiner* — Nicole Verley

(57) ABSTRACT

A method for calibrating an input electrical signal to an individual pressure control device includes the steps of providing a target pressure-to-current (P/I) threshold, providing a lower estimated P/I threshold, and providing an estimated P/I curve that passes between the target P/I threshold and the lower estimated P/I threshold. Next, the method determines a lower actual P/I threshold at a pressure equal to the pressure at the lower estimated P/I threshold. A maximum offset current is calculated from the difference between the currents at the lower actual P/I threshold and the lower estimated P/I threshold. Finally, the method calculates a calibrated P/I curve. The calibrated P/I curve includes the target P/I threshold and the lower actual P/I threshold. The slope of the calibrated P/I curve is calculated as a proportional value of the maximum offset current.

8 Claims, 2 Drawing Sheets

METHOD FOR CONTROLLING SOLENOID PRESSURE

CROSS-REFERENCE TO RELATED APPLICATIONS

Figure 1:
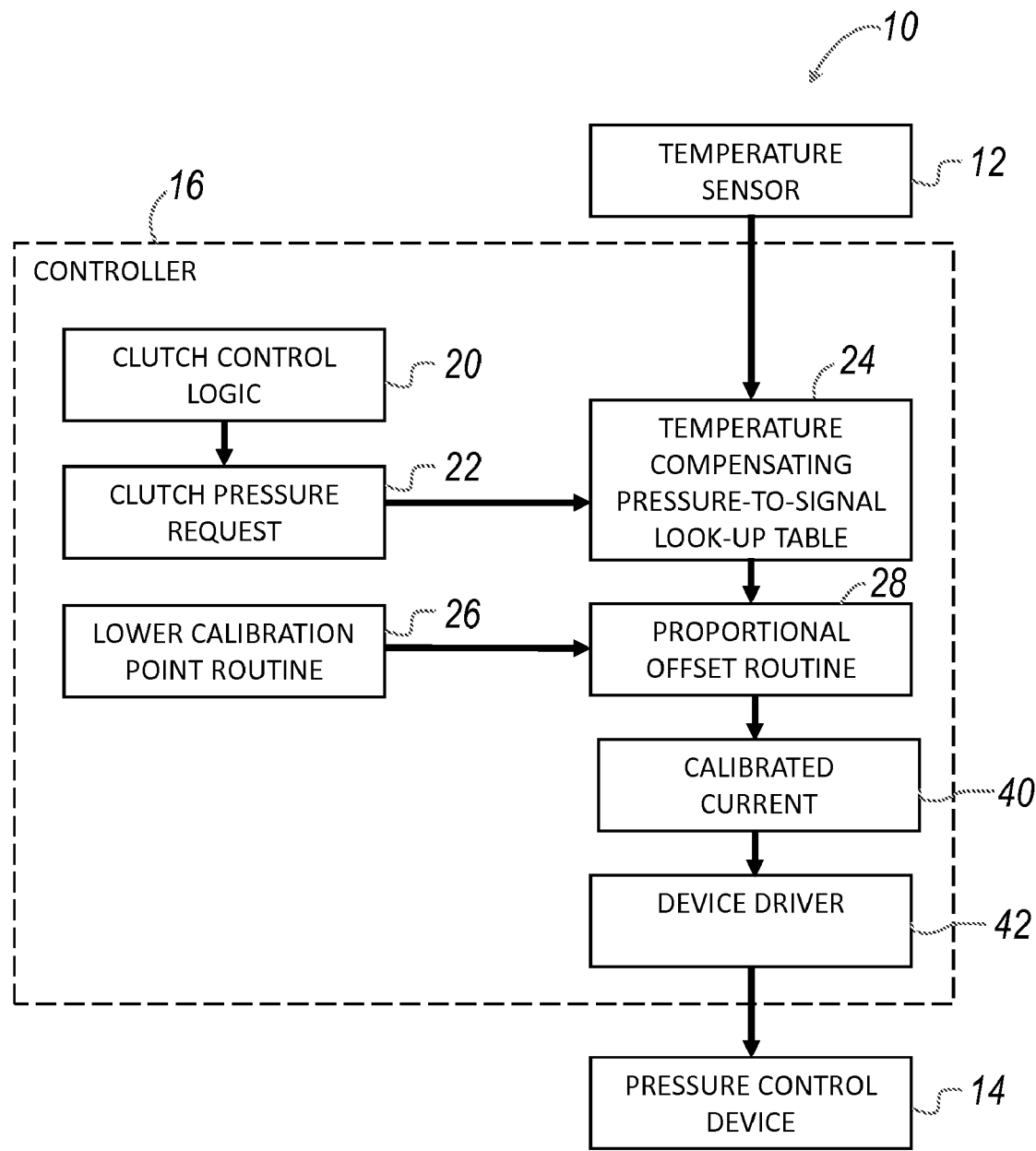

This application claims the benefit of U.S. Provisional Application No. 61/051,780, filed on May 9, 2008. The disclosure of the above application is incorporated herein by reference.

FIELD

The present disclosure relates to a system and method for controlling solenoid pressure, and more particularly to a system and method for compensating for the pressure output differences between solenoids in a control system.

BACKGROUND

The statements in this section merely provide background information related to the present disclosure and may or may not constitute prior art.

Electro-hydraulic pressure control devices (for example, a Variable Bleed Solenoid (VBS) or related device) are used to control automotive automatic transmissions and other systems. These electro-hydraulic pressure devices provide an output pressure that is a function of an electrical input. The electrical input is typically controlled and provided by a microprocessor based controller. The output pressure in turn is used to control components within the transmission. For example, a typical automatic transmission includes a plurality of actuatable friction devices, such as clutches or brakes that are controlled by an electronic control system. The electronic control system must provide the desired clutch pressure as prompted by an electrical input signal in order to achieve acceptable shift quality. Variations or inaccuracies in the output pressure supplied by the electro-hydraulic pressure device can decrease the shift quality of the transmission. Electro-hydraulic pressure device manufacturers have struggled to minimize these variations and inaccuracies.

One solution to variations and inaccuracies in the actual output pressure supplied by the electro-hydraulic pressure device is to adjust or calibrate the device in a final production test phase. However, known methods of calibrating the electro-hydraulic pressure device adjustment the curve that defines the relationship between input current and output pressure along the electrical input axis and does not significantly alter the overall curve shape or slope. While this adjustment is very helpful, it often is unable to prevent high electro-hydraulic pressure device reject rates at the supplier and does not address variation between individual devices in curve slope over the operating range.

Accordingly, there is a need in the art for a method of automatically calibrating a electro-hydraulic pressure device that improves on the accuracy of the calibration process. Additionally, this method should not require additional hardware components.

SUMMARY

The present invention provides a method for calibrating an input electrical signal to an individual pressure control device. The method includes the steps of providing a target pressure-to-current (P/I) threshold, providing a lower estimated P/I threshold, and providing an estimated P/I curve that passes between the target P/I threshold and the lower estimated P/I threshold. Next, the method determines a lower actual P/I threshold at a pressure equal to the pressure at the lower estimated P/I threshold. A maximum offset current is calculated from the difference between the currents at the lower actual P/I threshold and the lower estimated P/I threshold. Finally, the method calculates a calibrated P/I curve. The calibrated P/I curve includes the target P/I threshold and the lower actual P/I threshold. The slope of the calibrated P/I curve is calculated as a proportional value of the maximum offset current.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
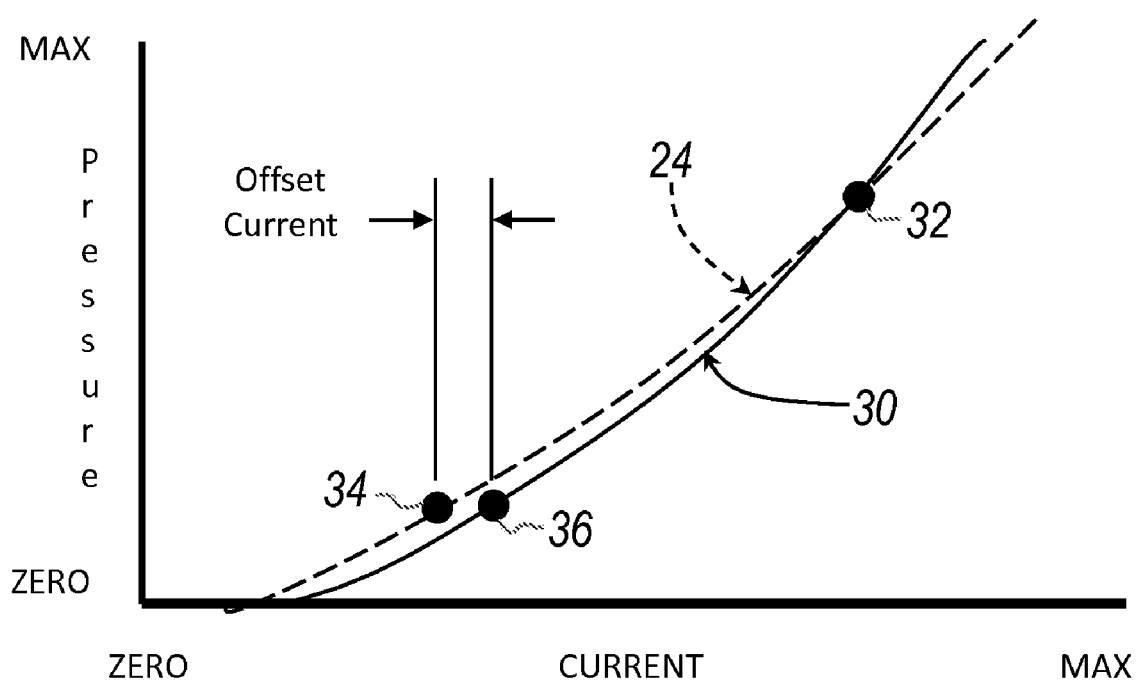

FIG. 1 is a schematic diagram of a system and method of calibrating a pressure control device according to the principles of the present invention; and FIG. 2 is a graph illustrating the method of calibrating a pressure control device according to the principles of the present invention.

DETAILED DESCRIPTION

The following description is merely exemplary in nature and is not intended to limit the present disclosure, application, or uses.

With reference to FIG. 1, a system for calibrating a pressure control device is generally indicated by reference number 10. The system 10 generally includes a temperature sensor 12, a pressure control device 14, and a controller 16. The system 10 in the embodiment provided is employed in a transmission of a motor vehicle. However, it should be appreciated that the system 10 may be employed in various other embodiments that use pressure control devices, such as, for example, engines or control systems.

The temperature sensor 12 is operable to detect or sense the current operating temperature of the transmission. The temperature sensor 12 may take various forms without departing from the scope of the present invention. The pressure control device 14 is a valve or solenoid that is operable to provide an output pressure in response to an electrical input signal. In the embodiment provided, the pressure control device 14 is a variable bleed solenoid that is operable to provide variable output pressure. Accordingly, the amount of output pressure is a function of the input electrical signal received by the pressure control device 14. It should be appreciated, however, that the pressure control device 14 may take various other forms without departing from the scope of the present invention. In the example provided, the pressure control device 14 is one of a plurality of pressure control devices that are part of a hydraulic control system. The output pressure provided by the pressure control device 14 is operable to control actuation or engagement of at least one of a plurality of torque transmitting devices, such as clutches and brakes.

The controller 16 is, in the example provided, a transmission control module having a preprogrammed digital computer or processor, control logic or routines, memory used to store data, and at least one I/O peripheral. However, other types of controllers may be employed without departing from the scope of the present invention. The controller 16 is in communication with the temperature sensor 12 and with the pressure control device 14. More specifically, the controller 16 is configured to receive data signals from the temperature sensor 12 indicative of the operating temperature of the transmission and to send control signals or input electrical signals to the pressure control device 14. The input electrical signals are preferably in the form of a controlled direct current or a voltage pulse width modulation duty cycle percent.

During operation of the transmission, the controller 16 includes clutch control logic 20 that determines which torque transmitting devices must be engaged or disengaged at any given time. The clutch control logic 20 generates a clutch pressure request 22 that is indicative of the required hydraulic fluid pressure needed to engage or disengage the torque transmitting devices. The clutch pressure request 22 is then filtered through a temperature compensating pressure-to-signal look-up table 24. The controller 16 uses the current operating temperature of the transmission as sensed by the temperature sensor 12 to adjust the clutch pressure request signal to account for the temperature. More specifically, the temperature compensating pressure-to-signal look-up table 24 provides an input signal required to produce the requested output pressure calibrated for transmission temperature.

With reference to FIG. 2, the controller 16 stores in memory a nominal pressure-current (P/I) curve 30 that estimates the relationship between an input signal, such as, for example, an electrical current, and an actual output pressure provided by the pressure control device 14. It should be appreciated that the pressure scale shown in FIG. 2 can refer to either output pressure directly measured from the pressure control device 14 or clutch pressure. The nominal curve 30 has a calibration target threshold 32 located near an upper region (high pressure and high current) of the nominal P/I curve 30. The calibration target threshold 32 is selected to be near the upper end of the transmission's critical clutch control pressure range (i.e. the upper range of output pressures that are critical to accurately controlling the clutch or other device that receives the output pressure). The pressure control device 14 is manufactured to have an actual P/I curve that passes through the calibration target threshold 32. Accordingly, at the calibration target threshold 32 the estimated current required to provide an actual output pressure from the pressure control device 14 is equal to the actual current required to provide the actual output pressure. However, the actual P/I curve for the pressure control device 14 (i.e., the actual current needed to supply a given actual output pressure) may vary from the nominal P/I curve above and below the calibration target threshold 32.

In order to account for this difference between the actual P/I curve and the nominal P/I curve, the controller 16 initiates a method for calibrating the input signal in order to accurately provide a desired output pressure supplied by the pressure control device 14. The method includes a lower calibration threshold routine 26 and a proportional offset routine 28. The lower calibration threshold routine 26 establishes a lower calibration threshold 34. The lower calibration threshold 34 is the actual current required to produce a given output pressure. The lower calibration threshold 34 has the same output pressure as a lower nominal threshold 36 located on the nominal P/I curve 30. However, due to the individual operating characteristics of each pressure control device 14 noted above, the actual current at the lower calibration threshold 34 is different from the estimated current at the lower nominal threshold 36. The lower calibration threshold 34 is automatically established for each pressure control device 14 in the transmission during transmission operation by the lower calibration threshold routine 26. One method of establishing the lower calibration threshold 34 includes optimizing diagnostic system hardware to determine the actual current required to achieve a specific output pressure from each pressure control device 14 in the transmission. This method is described in commonly assigned U.S. Pat. No. 6,382,248, herein incorporated by reference as if fully disclosed herein. Another method of establishing the lower calibration threshold 34 includes using software that is operating while the running vehicle is still on the assembly line to determine the actual current that each pressure control device 14 requires to begin clutch engagement. This method is described in commonly assigned U.S. Pat. No. 7,069,767, herein incorporated by reference as if fully disclosed herein. The lower calibration threshold 34 is selected to be at the lower end of the transmission's critical clutch control pressure range, i.e., the range of clutch or pressure control device output pressures that can significantly affect shift quality. The lower calibration threshold 34 is obtained when the transmission is at a temperature consistent with the temperature sensed by the temperature sensor 12 and used by the temperature compensating pressure-to-signal look-up table 24. Accordingly, the controller 16 may provide an interim lower calibration threshold 34 value from non-target temperature data while amassing target temperature data for the final lower calibration threshold 34 value.

Next, the proportional offset routine 28 within the controller 16 calculates an offset signal or current from the difference between the actual current determined by the proportional offset routine at the lower calibration threshold 34 and the estimated current at the lower nominal threshold 36 for the same output pressure. The offset current is then used to create a calibrated P/I curve or relationship 38 that includes both the calibration target threshold 32 and the lower calibration threshold 34. The offset current used to calculate the calibrated P/I curve between the calibration target threshold 32 and the lower calibration threshold 34 is proportional to the requested output pressure between the thresholds 32 and 34. In other words, the offset current for a given output pressure varies non-linearly between thresholds 32 and 34 based on what output pressure is requested. Accordingly, the maximum current offset occurs when an output pressure is required at the lower calibration threshold 34. The offset current required for output pressures between the lower calibration threshold 34 and the target threshold 32 then decreases non-linearly as the output pressures approach the target threshold 32. At all output pressure requests located between thresholds 32 and 34 on the P/I curve, the offset current would be proportional to the location of the requested pressure between the pressures of thresholds 32 and 34. At all output pressure requests below threshold 34, the offset current used is the offset current measured between the lower calibration threshold 34 and the lower nominal threshold 36. If an output pressure at or above the calibration target threshold 32 is requested, no modification of the current is required. Accordingly, the proportional offset routine 28 is operable to determine a calibrated current command 40 from the clutch pressure request.

The calibrated current command 40 is then communicated to a device driver 42, which in turn is operable to send a control signal to the pressure control device 14. The control signal more closely matches the P/I characteristics of each pressure control device 14 in the transmission.

The description of the invention is merely exemplary in nature and variations that do not depart from the gist of the invention are intended to be within the scope of the invention. Such variations are not to be regarded as a departure from the spirit and scope of the invention.

I claim the following:

1. A method for calibrating an input signal sent to a pressure control device with an output pressure provided by the pressure control device, the method comprising the steps of:
providing a target threshold that comprises a first actual input signal operable to produce a first output pressure;
providing a lower estimated threshold that comprises a first estimated input signal estimated to produce a second output pressure;
providing an estimated signal-to-pressure relationship that provides a plurality of estimated input signals estimated to produce a plurality of output pressures, the estimated signal-to-pressure relationship including the target threshold and the lower estimated threshold;
determining a lower target threshold that comprises a second actual input signal required to produce the second output pressure;
calculating a signal offset from the difference between the second actual input signal and the first estimated input signal;
determining a calibrated signal-to-pressure relationship that provides a plurality of calibrated input signals operable to produce the plurality of output pressures, wherein the plurality of calibrated input signals are proportionally offset from the plurality of estimated input signals using a proportional value of the signal offset.

2. The method of claim 1 wherein the target threshold is located in an upper range of output pressures provided by the pressure control device.

3. The method of claim 1 wherein the lower estimated threshold is located in a lower range of output pressures provided by the pressure control device.

4. The method of claim 1 wherein the plurality of output pressures is located between the first output pressure and the second output pressure.

5. The method of claim 1 wherein the signal offset used to calculate each of the plurality of calibrated input signals decreases as the pressure increases between the first output pressure and the second output pressure.

6. The method of claim 1 wherein the first output pressure is greater than the second output pressure.

7. The method of claim 1 wherein the calibrated signal-to-pressure relationship provides a second plurality of calibrated input signals for a second plurality of output pressures that are lower than the second output pressure, and wherein the second plurality of calibrated input signals are offset from the plurality of estimated input signals using the signal offset.

8. The method of claim 1 further comprising a step of adjusting the calibrated input signals for temperature.

* * * * *